Figure 8:
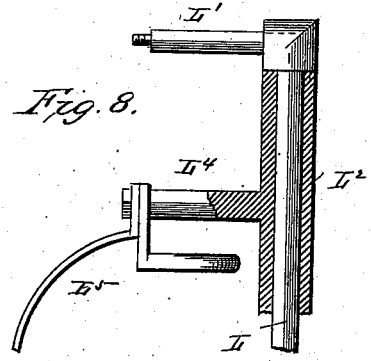

(No Model.) 12 Sheets—Sheet 1.
M. L. NICHOLS.
GRAIN BINDING HARVESTER.
No. 381,080. Patented Apr. 10, 1888.
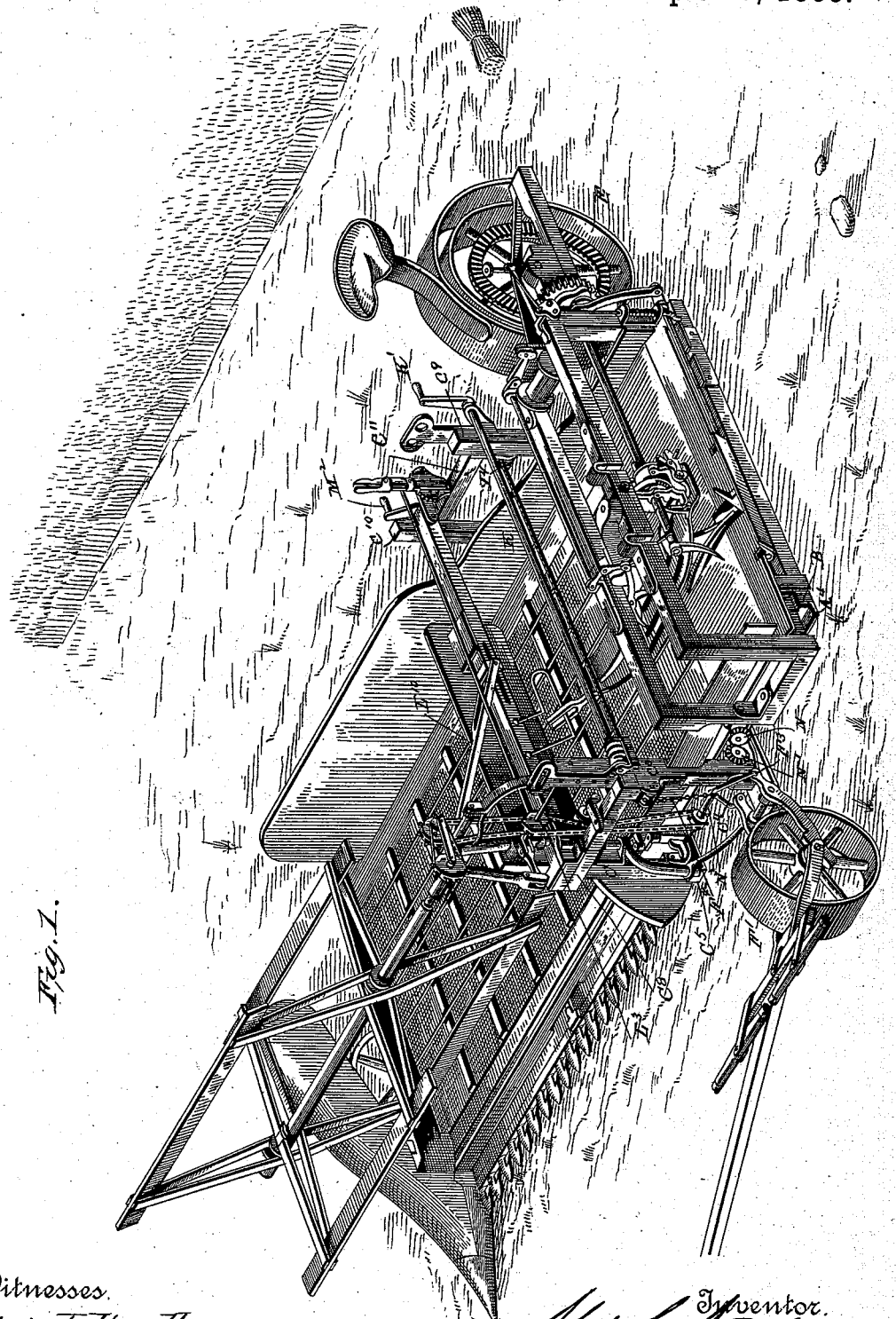

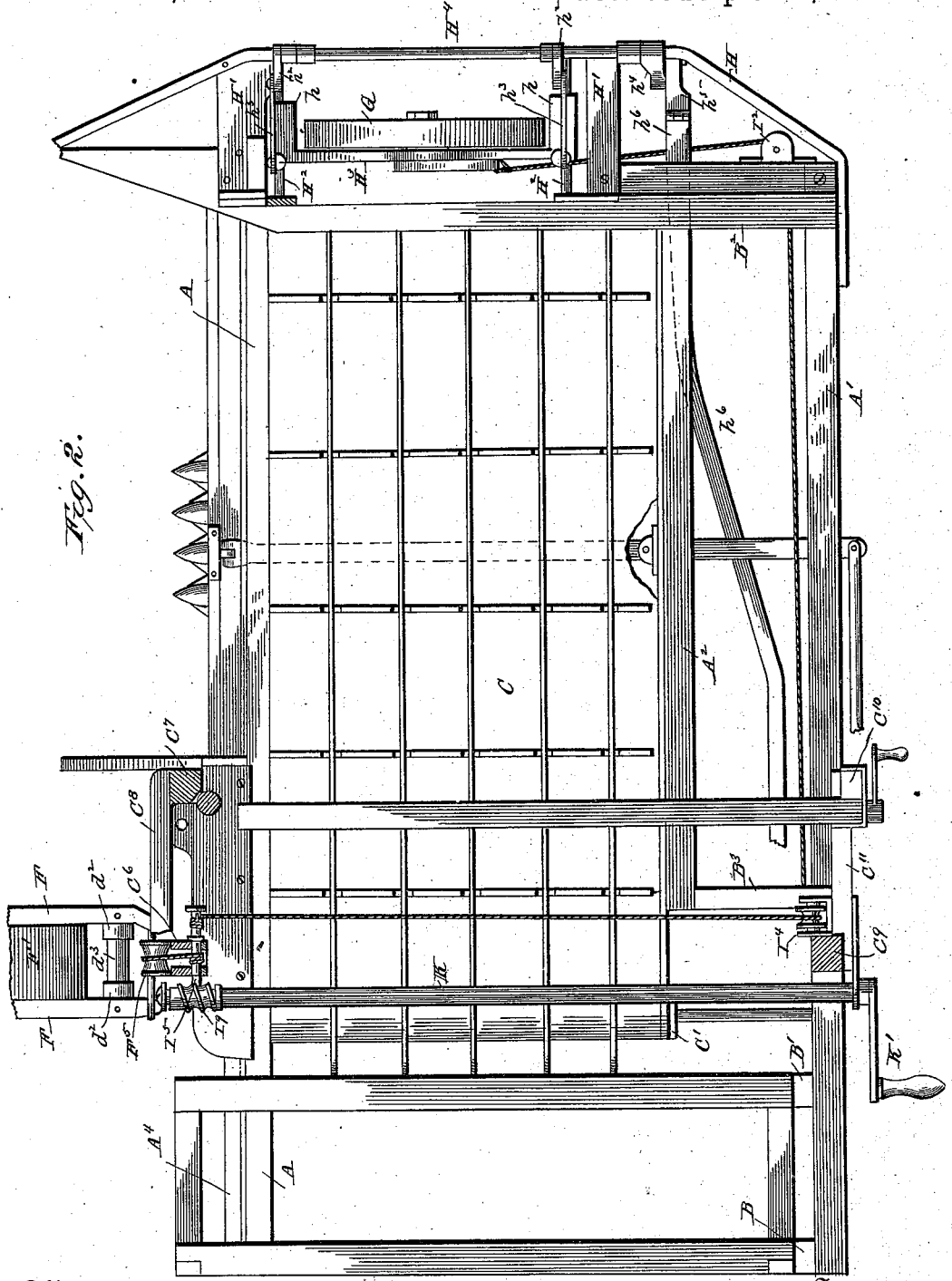

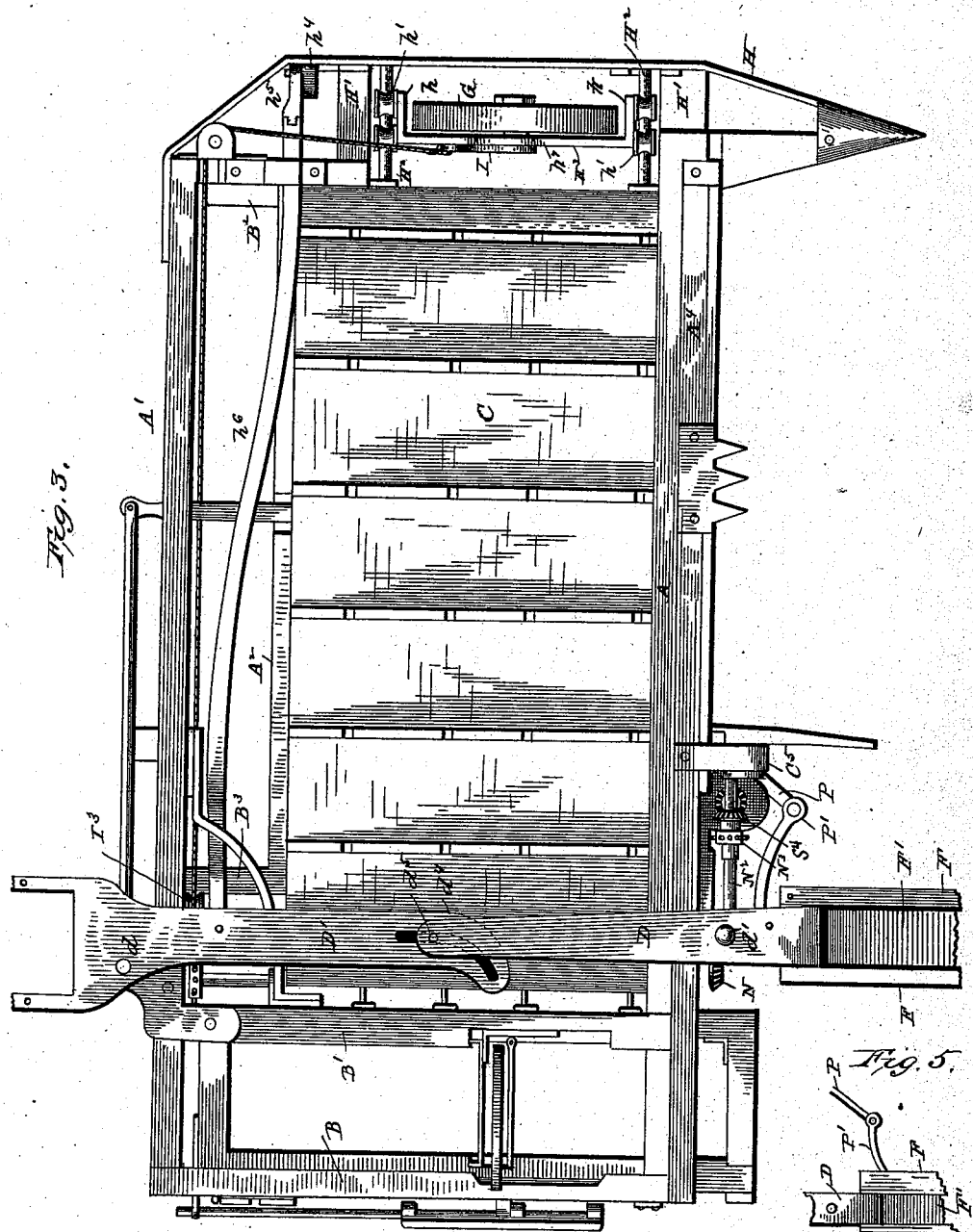

(No Model.)   12 Sheets—Sheet 4.
M. L. NICHOLS.
GRAIN BINDING HARVESTER.
No. 381,080. Patented Apr. 10, 1888.
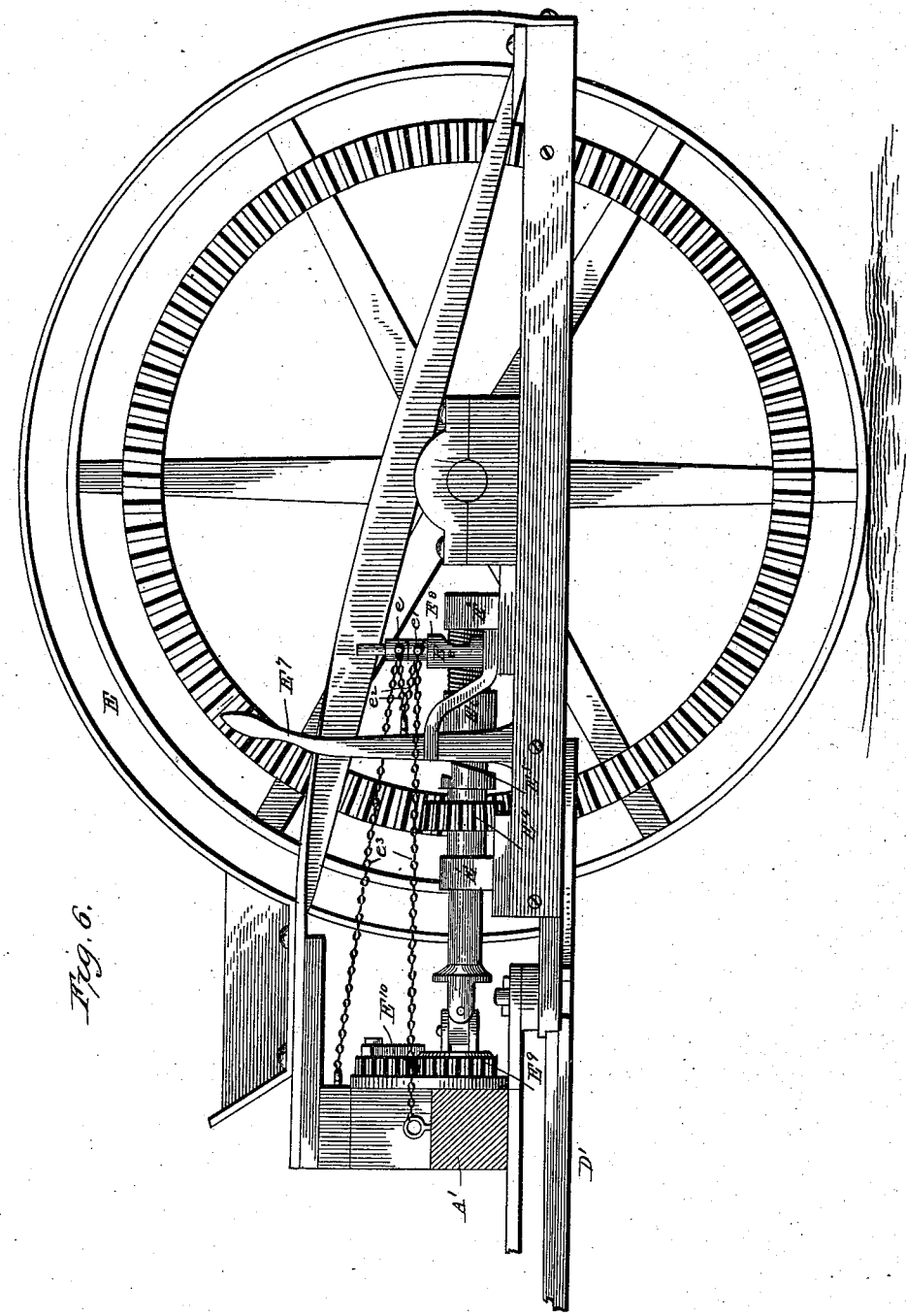

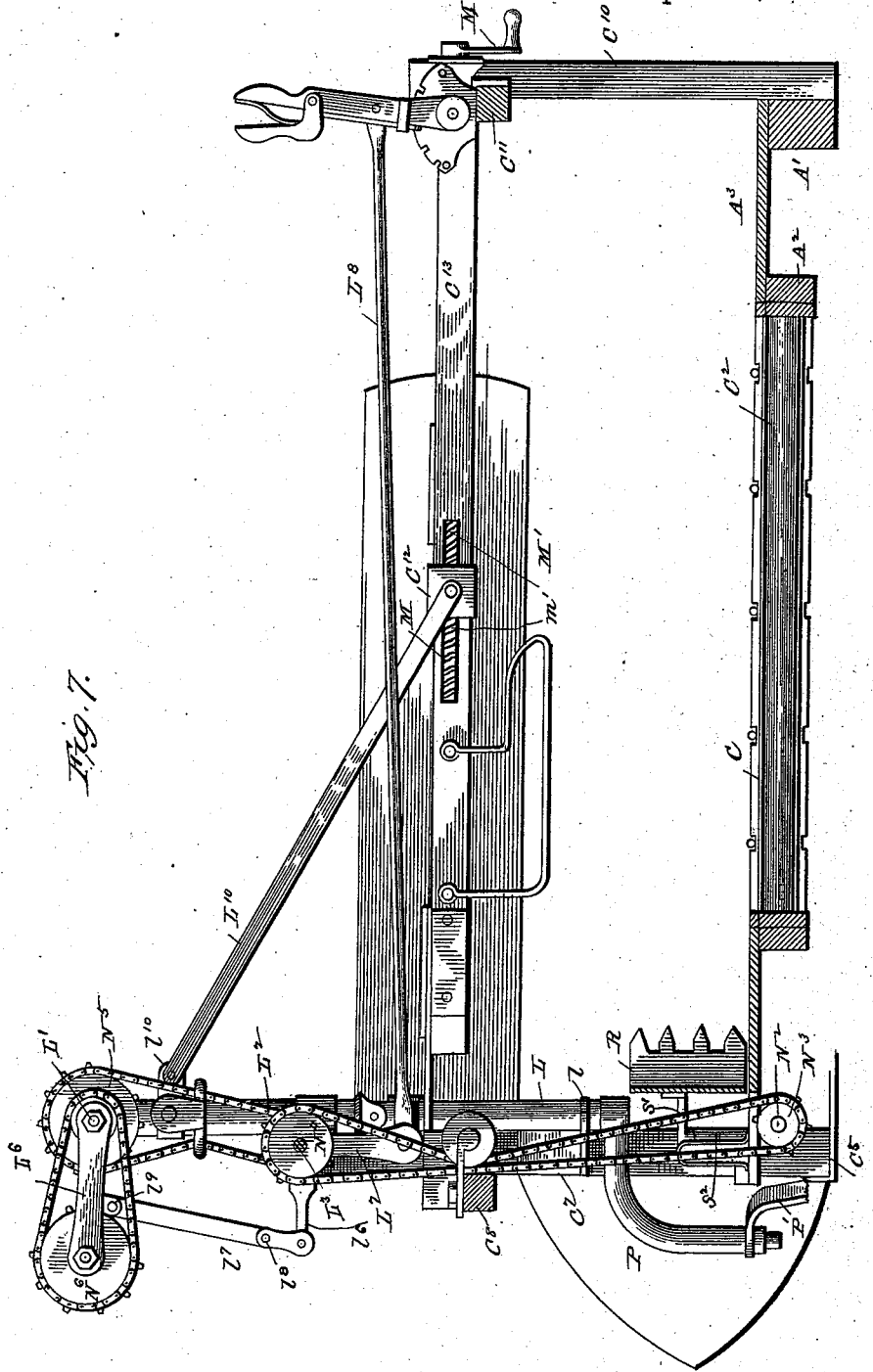

(No Model.)

M. L. NICHOLS.
GRAIN BINDING HARVESTER.

No. 381,080. Patented Apr. 10, 1888.

Witnesses
Edwin L. Yewell,
Wm. F. Huntemann

Inventor.
M. L. Nichols
By his Attorney.
Alex Mahon (No Model.)
M. L. NICHOLS.
GRAIN BINDING HARVESTER.
No. 381,080. Patented Apr. 10, 1888.
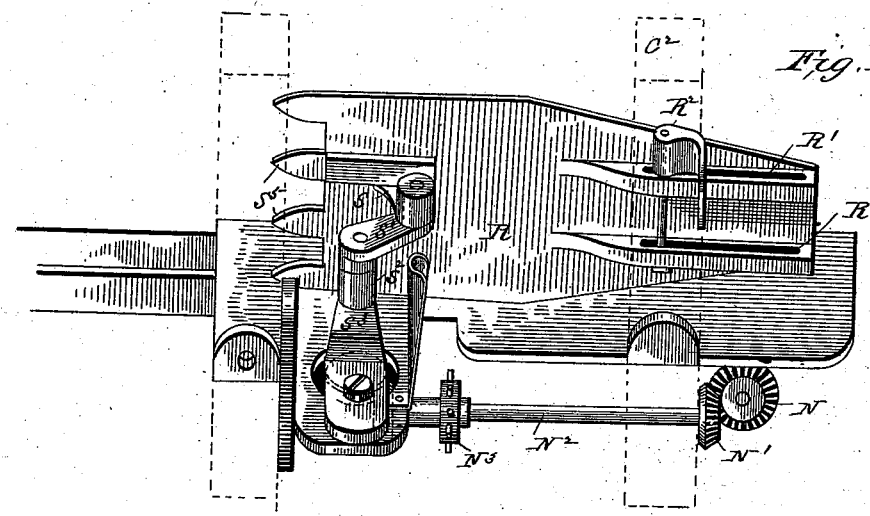
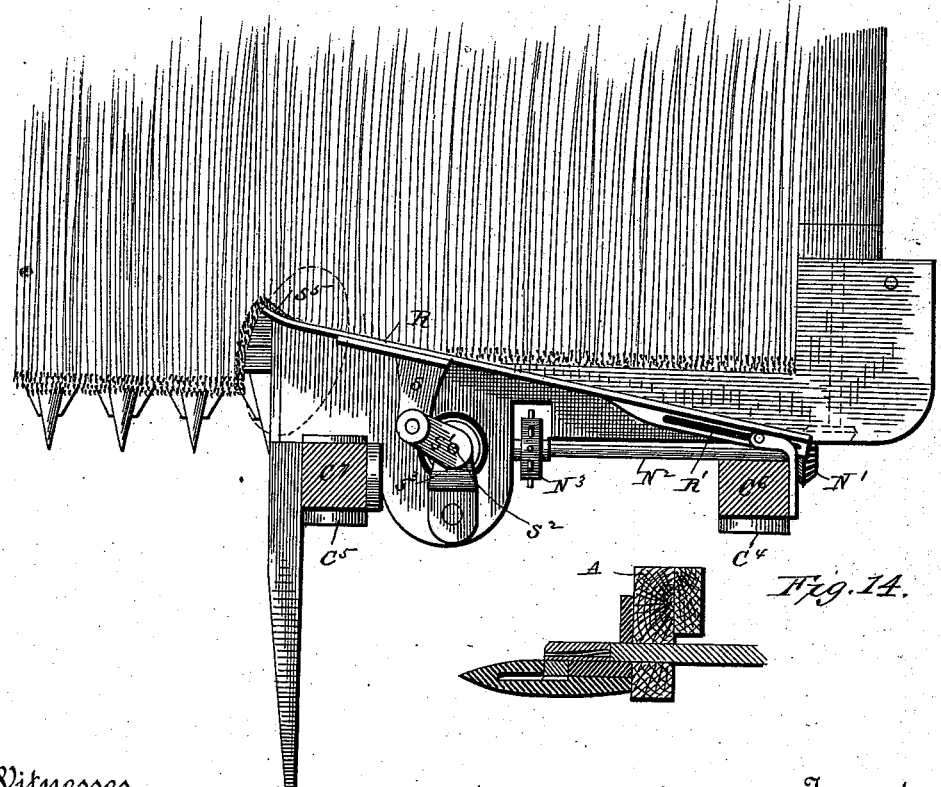

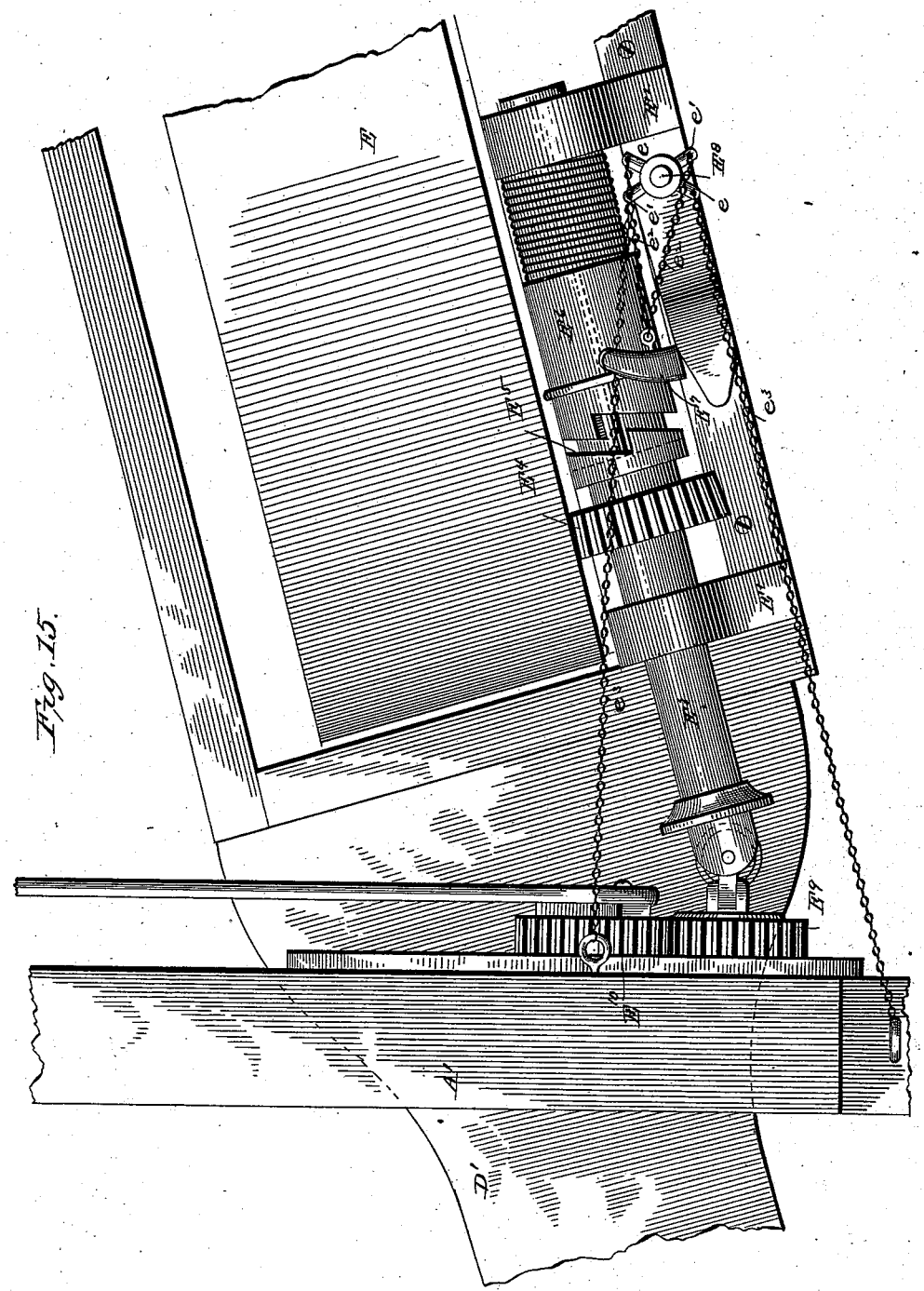

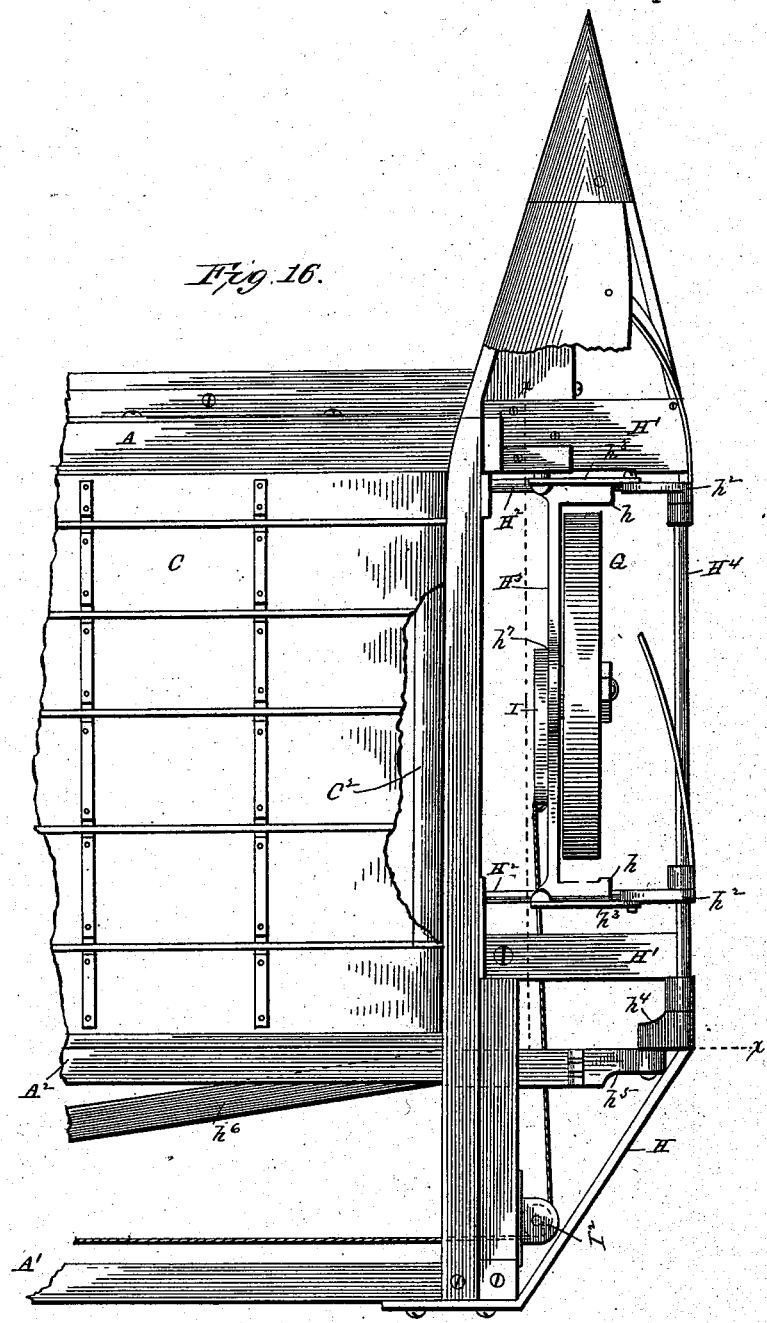

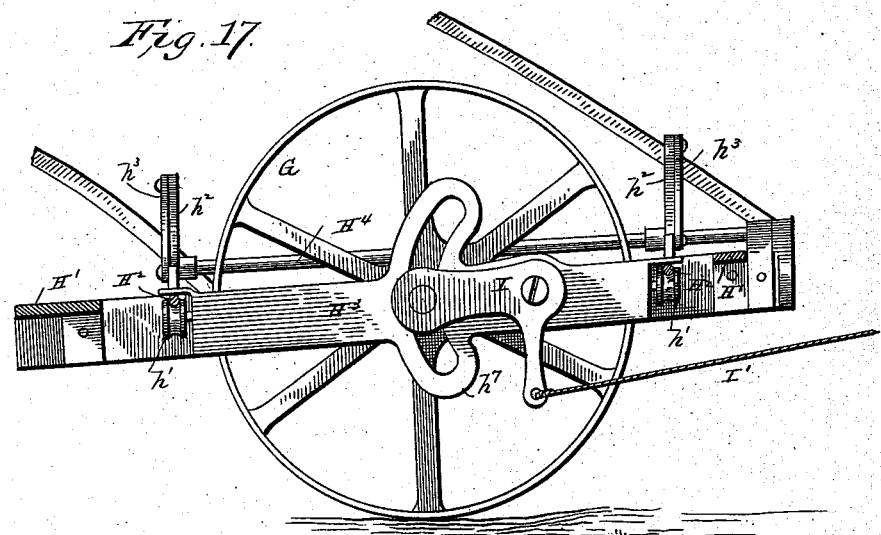
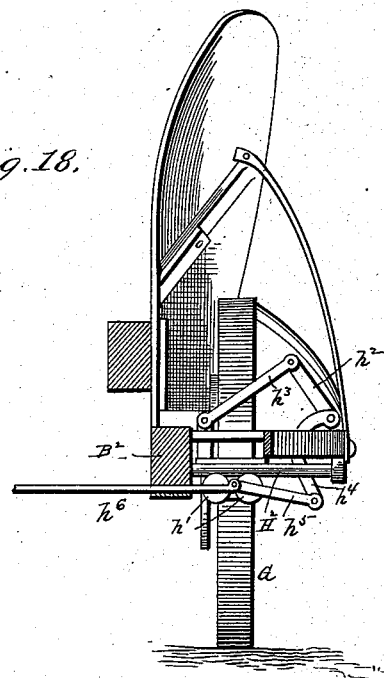

(No Model.) 12 Sheets—Sheet 11.
M. L. NICHOLS.
GRAIN BINDING HARVESTER.
No. 381,080. Patented Apr. 10, 1888.

Witnesses
Edwin I. Yewell,
Wm. T. Hintermann.

Inventor.
M. L. Nichols.
By his Attorney.
Alex Mahon.

(No Model.) 12 Sheets—Sheet 12.
M. L. NICHOLS.
GRAIN BINDING HARVESTER.
No. 381,080. Patented Apr. 10, 1888.
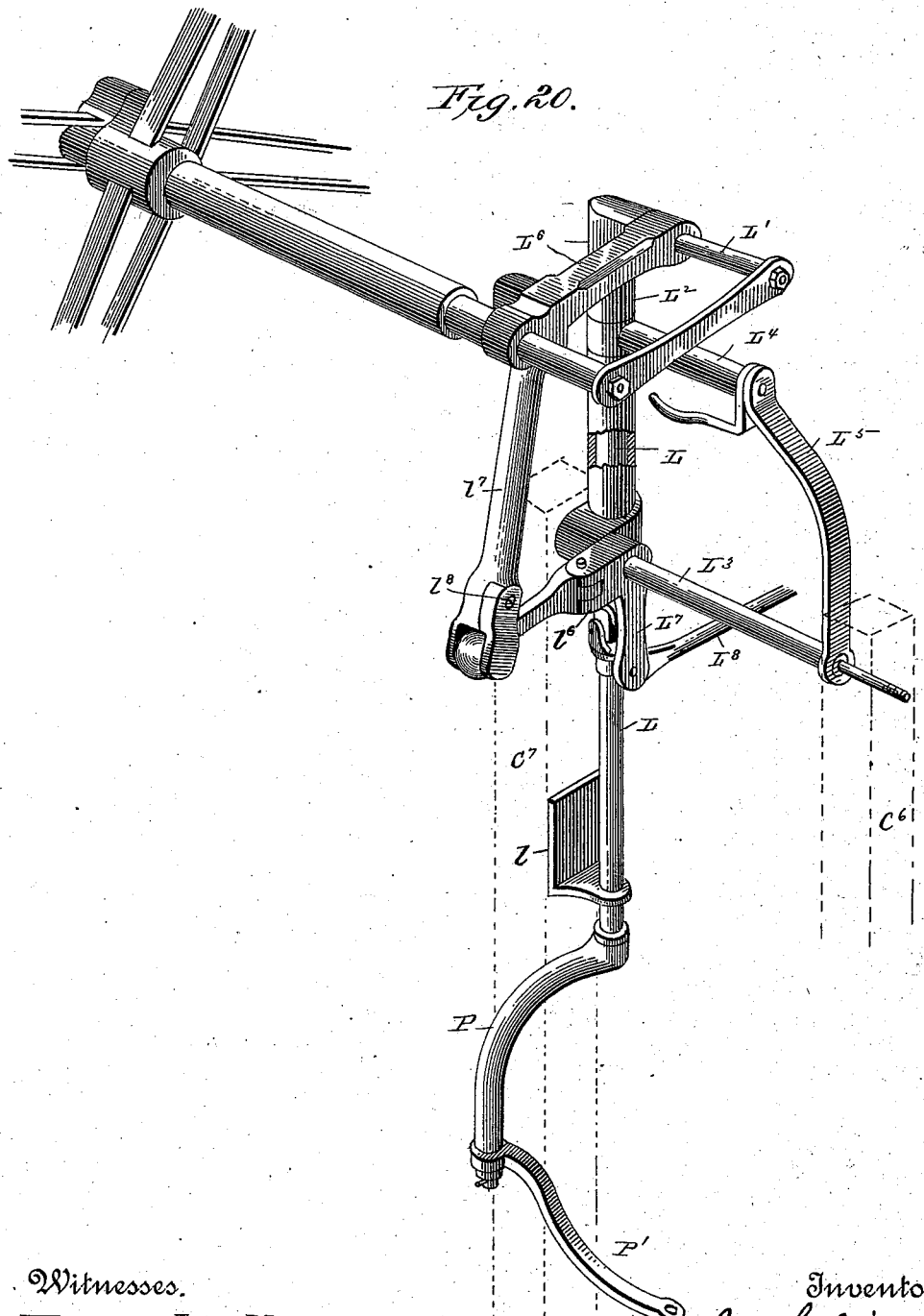

UNITED STATES PATENT OFFICE.

MARION L. NICHOLS, OF NEW YORK, N. Y., ASSIGNOR TO THE NICHOLS HARVESTER COMPANY, OF SAME PLACE.

GRAIN-BINDING HARVESTER.

SPECIFICATION forming part of Letters Patent No. 381,080, dated April 10, 1888.

Application filed January 11, 1887. Serial No. 224,025. (No model.)

*To all whom it may concern:*

Be it known that I, MARION L. NICHOLS, of the city, county, and State of New York, have invented certain new and useful Improvements in Grain-Binding Harvesters, of which the following is a full and exact description, reference being had to the accompanying drawings, making part of this specification.

My invention relates to that class of machines particularly applicable for use with automatic binding devices, and in which the grain is delivered to said binding devices on a level, or nearly so, with the cutting apparatus and platform-carrier, and known as "low-down binders," and the parts constituting the machine herein shown and described are designed to operate conjointly to act upon the grain and to adapt the machine to the various conditions incident to the harvest-field, so that the grain shall be properly carried into the cutters, cut, deposited upon the platform, and properly presented to the binding devices to be readily and properly bound thereby, the binding devices forming the subject of a separate application of even date herewith.

The invention consists in a novel manner of mounting the harvester-frame upon two or more wheels, having pivotal connection therewith, to operate conjointly one with the other, whereby the frame may have a lateral motion actuated by and relative to the wheels in turning the machine.

It further consists in supporting the wheels in the frame-bars, having pivotal connections with the main frame, and arranged to engage and be actuated one by the other in the movements of the machine.

It further consists in mounting the harvester-frame between pivoted supporting-wheels, whereby an unobstructed and direct passage for the grain from the carrier to the binding devices is obtained, while providing for the ready turning of the machine and avoiding the dragging of the wheels in the ground and the consequent extra strain upon the team.

It further consists in connecting the tongue with the front supporting-wheel, whereby the swinging movement of the tongue is communicated to the main frame through the frame-bars of the wheels.

It further consists in the combination, with the main supporting-wheel, of an end or grain wheel having a connection therewith, whereby the frame is caused to move endwise relatively to all of said wheels.

It further consists in the combination of the front supporting-wheel, having its supporting-frame pivotally connected with the frame, and an adjustable grain-wheel with devices connected with said wheels and the main frame to raise and lower the frame relatively to said wheel simultaneously and independently of the master-wheel, for raising and lowering the cutters.

It further consists in a novel manner of mounting the outer or grain wheel in the frame and the means for connecting the same thereto.

It further consists in a novel manner of connecting the driving mechanism with the frame, whereby the same is, with the devices to which it communicates motion, thrown out of action automatically in turning the machine.

It further consists in combining the swiveling sleeved reel-post mounted in the main frame with the turning mechanism, whereby the reel is swung out of the way in turning the machine.

It further consists in the combination of the automatically-operated swiveling sleeved reel-post with means for raising and lowering the reel in its various angles of adjustment.

It further consists in the combination of the carrier extending inward beyond the cutters and a vertically-arranged butt-rake located between the cutting apparatus and binding devices, with means arranged adjacent to the cutters for imparting both an endwise and reciprocating motion to the rake to even up the butts and carry the grain toward the binding devices.

It further consists in certain novel features in the construction and arrangement of the several parts, all as hereinafter described.

Figure 11:
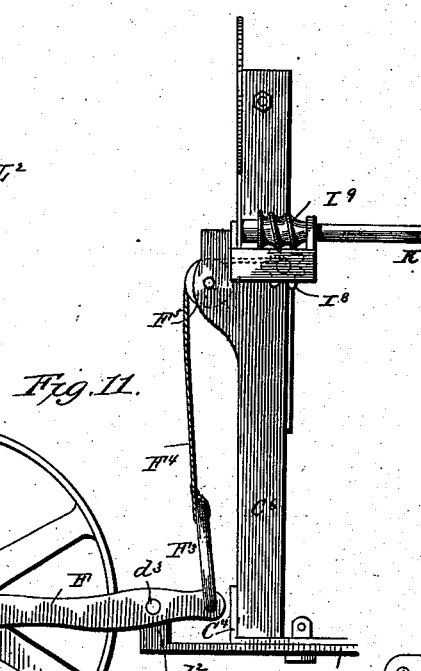
Figure 10:
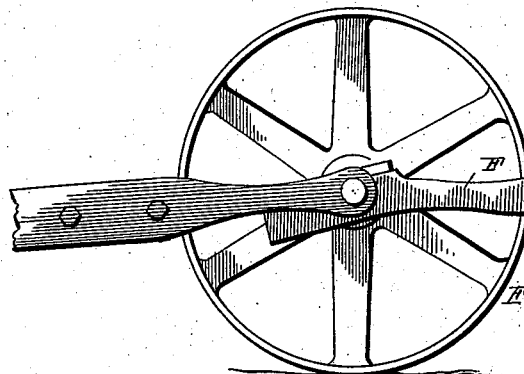
Figure 9:
Figure 19:
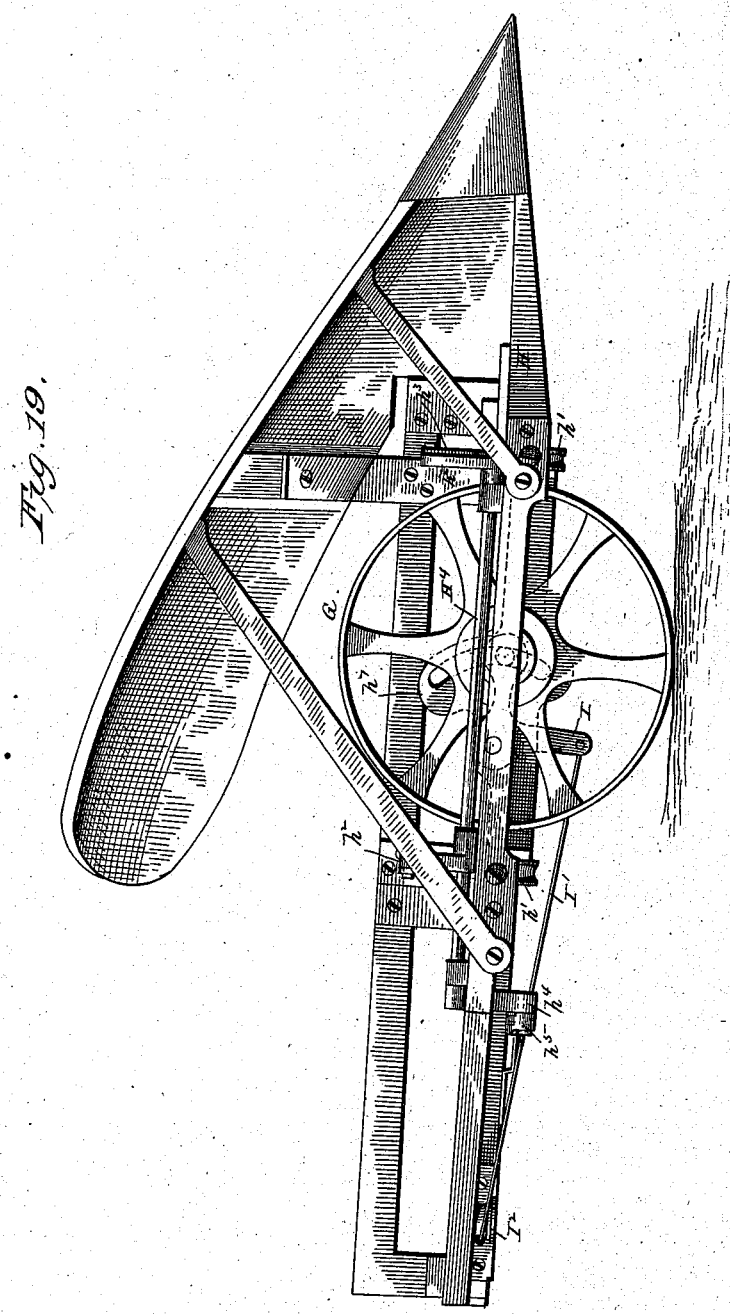

In the accompanying drawings, Figure 1 is a perspective view of the machine complete, taken from the stubble side, showing the relation of the binding devices thereon. Fig. 2 is a plan or top view of the machine with the reel and binding devices removed. Fig. 3 is a bottom view showing the rear wheel removed, also showing one manner of connecting the frame-bars of the main supporting-wheels, also one means for connecting the reel-post with the turning mechanism and the means for driving the reel and rake, also showing the outer or grain wheel and one manner of connecting it with the frame-bars of the turning mechanism. Fig. 4 shows a modification in the manner of connecting the frame-bars of the wheels; Fig. 5, a modification in the manner of connecting the swiveling reel-post with the turning mechanism. Fig. 6 is a side view of the master-wheel and frame, showing the clutches and shaft and the automatic shifting mechanism. Fig. 7 is a section through a portion of the frame, showing the manner of mounting and controlling the reel, also the manner of driving the same. Figs. 8, 9, and 10 are detached views of the reel-post and sleeve. Fig. 11 is a side view of the front supporting-wheel, showing the manner of connecting it with the frame and the means for changing the relation of the frame thereto for raising and lowering the cutters. Fig. 12 is a perspective view of the rake and the means for reciprocating and giving endwise movement to the same. Fig. 13 is a plan or top view of a portion of the cutting apparatus and carrier, showing the relation of the rake thereto, also showing by dotted lines the path of movement of the rake. Fig. 14 is a section through the front sill of the machine, showing one of the guard-fingers and a section of knife. Fig. 15 is a plan view of a portion of the master-wheel and its supporting-frame, showing the manner of communicating motion therefrom to the operating parts of the machine and the means whereby the driving mechanism is thrown automatically into and out of action. Fig. 16 is a top view of the outer end of the platform, showing the arrangement of the outer or grain wheel. Fig. 17 is a section of the outer end of the frame, taken through the line $x\ x$, Fig. 16, showing the manner of connecting the grain-wheel-supporting frame with the machine and the manner of supporting the wheel therein. Fig. 18 is a section through the rear end of the grain-wheel-supporting frame, and Fig. 19 is an end view showing the wheel and its connections complete. Fig. 20 is a detached perspective view of the reel-post and attachments with sprocket-wheels removed.

The main frame is made in rectangular form, and consists of the front and rear sills or bars, A A', inner cross-bars, B B', and an outer cross-bar, $B^2$. The distance between the front and rear sills, A A', is made wider than the apron or carrier, and behind the carrier or apron is arranged a bar, $A^2$, connected at the outer end to the cross-bar $B^2$ and at the inner end to a cross-bar, $B^3$. The carrier or apron C extends from the outer or grain side of the machine past the inner end of the cutting apparatus, passing around and being supported by rollers C' $C^2$, one located near the grain-wheel and the other between the cross-bars B' $B^3$, so that the apron shall pass around the bar $B^3$ and move in near relation to the outer face of the bar B', the binder-frame being located upon the bars B B', so that the grain deposited upon the apron or carrier in the rear of the cutting apparatus shall be carried by the same into position to be acted upon by the binding devices, the space behind the apron and between the bar $A^2$ and rear sill, A', being closed by a plank or covering, $A^3$.

An angle bar or iron, $A^4$, is bolted to the forward frame-bar, A, and extends from end to end of the same, to which the guard-fingers are bolted, and which bar or iron forms a support or bearing for parts of the mechanism, hereinafter referred to, located between the inner shoe and the binder-frame.

In suitable angle-plates, $C^4\ C^5$, connected to the front sill and angle-bar, are supported upright posts $C^6\ C^7$, one located adjacent to the inner shoe and the other adjacent to the frame bar or timber B', said posts being connected near their upper ends by a cross-bar, $C^8$. Similar posts, $C^9\ C^{10}$, are connected to the rear sill, A', in line with the front posts, being similarly connected near their upper ends by a cross-bar, $C^{11}$. The frame thus constructed is mounted upon bars or supports D D', which have vertically-arranged pivotal connections $d\ d'$ therewith, the rear bar, D', extending out behind the main frame and supporting the rectangular frame for the master-wheel E, which is rigidly secured thereto. The front support or bar, D, extends out beyond the main frame, and has formed near its outer end lugs or ears $d^2$, through which the frame F, for the front supporting-wheel, F', is connected by a rod or shaft, $d^3$. This frame is composed of two arms rigidly connected to the axle of the wheel, one upon each side thereof, and extending back beyond their points of connection with the bar D', and being in turn connected by a yoke or bail, $F^3$, hereinafter referred to.

The supports or bars D D' are shown as extending inward beyond their pivotal connection and into engagement with each other, and the bar D' provided with a slotted end, $d^4$, a portion being made straight and with a curved end, and the arm D as provided with a projecting pin, $d^5$, engaging and adapted to move in said slot, the construction and arrangement being such that in turning the front wheel to turn the machine the pin on said arm will be caused to move through the slot and turn or move the bar D' on its pivot, and the rear wheel to be turned to an opposite inclination, or into proper position to follow in the curved path, or nearly so, of the front wheel, this movement causing the frame to change its relation endwise to the supporting-bars, so that the machine may readily turn the curves, permitting the front wheel to be turned at a greater angle than the rear wheel to facilitate the turning of the machine within a narrow space.

A modification in the manner of engaging the two bars is shown in Fig. 4, in which segmental toothed faces formed on the end of each bar to engage each other, and which construction operates, as will be readily seen, in a similar manner to that shown in Fig. 3.

The outer grain-wheel, G, is supported in suitable bearings at the end of the machine in the following manner: A frame or bar, H, is bolted to the rear sill, and extends out therefrom at an angle of about forty-five degrees, more or less, to about in line with the frame-bar $A^2$, from which point it extends forward parallel with the cross-bar $B^2$ to a point about on a line with the front sill, A, where it is bent inward at about the same angle with its rear end to form a support for the divider point. This frame-bar is supported between its two ends by cross rods or bars H', secured to it and to the cross-bar $B^2$ of the frame. Between these bars and secured in a similar manner are arranged rods $H^2$, forming tracks or guideways, hereinafter referred to. A frame, $H^3$, has its ends $h$ bent at right angles to its face, and in which ends are mounted friction-wheels $h'$, having their peripheral faces formed to fit and engage the rods $H^2$.

A rock-shaft, $H^4$, mounted in suitable bearings formed with or secured to the frame H, has connected to it near each end a rod or link, $h^2$, which are in turn connected with links $h^3$, secured to lugs formed or attached to the frame $H^3$. At the inner end of the rock-shaft $H^4$ is rigidly secured a bent depending arm, $h^4$, having a link, $h^5$, connected therewith, which is in turn connected with a rod, $h^6$, mounted in suitable guideways in the frame, and which rod extends from its point of connection with the link $h^5$ to and is connected with the wheel-supporting bar D', for a purpose hereinafter explained.

The frame $H^3$ is provided centrally of its length with a curved slotted portion, $h^7$, through which the axle of the wheel G passes, the wheel being mounted upon an axle formed with or projecting from the face of one end of a bell-crank lever, I, pivoted in the frame $H^3$, the other arm extending down from the pivotal point, and has connected to it a cord or chain, I', which passes back and around a pulley, $I^2$, mounted in the bar $B^2$, thence longitudinally of the frame over a pulley, $I^3$, up over a pulley, $I^4$, and thence forward and is connected to a shaft, $I^5$, mounted in bearings in the post $C^6$. This shaft extends through the post, and has mounted upon its opposite end a toothed wheel, $I^8$, which engages with a worm-gear, $I^9$, on the end of a shaft, K, supported in bearings secured to the front post, $C^6$, and the rear post, $C^9$, the shaft at its rear end being provided with a crank or handle, K', within convenient reach of the driver.

The bail $F^3$, connecting the arm forming the frame or support for the front supporting-wheel before referred to, has connected to it a chain, $F^4$, which passes thence over a pulley, $F^5$, mounted in bearings projecting from the face of the post $C^6$, the pulley being in front of and in line with the portion of the shaft $I^5$ extending through the post before referred to, the chain $F^4$ passing over the pulley and being connected to the shaft, the post being cut out at this point to give sufficient room on the shaft to permit the winding of the chain thereon.

From the foregoing it will be seen that, the front and end or grain wheel having pivotal connections with the frame and being suspended and controlled from and by the same operating mechanism, the relation of the frame to both to raise and lower the cutters may be simultaneously changed by the driver, the means being positive in their action, and can be accomplished with little exertion on the part of the driver, and being held at any point in the range of movement positively and without the intervention of any stops or holding devices.

The rod $h^6$, which is connected with the depending arm on the rock-shaft $H^4$, which controls the movement of the frame endwise relatively to the grain-wheel, as before stated, is connected with the wheel-supporting bar D', and consequently any movement of the frame endwise caused by the movement of said wheel-supporting bars in the turning of the machine will permit the frame to also move relatively to said grain-wheel, and consequently further facilitate the ease with which it may be turned, preventing any dragging of the grain-wheel consequent to the necessity for end movement in turning, which would be the case if the wheel was rigidly fixed to the frame.

The rod $h^6$, while being shown and described as being connected with the supporting-bar D', may, if preferred, be connected with the bar D or with the tongue, as shall be found desirable as occasion shall require.

The master-wheel E, as before stated, is supported in a rectangular frame rigidly secured to the frame-bar D', and one of the side timbers of the frame has mounted upon it bearings E' $E^2$ for the shaft $E^3$, through which motion is communicated from the master-wheel to the various parts of the machinery. This shaft has loosely mounted upon it, between the bearings, a pinion, $E^4$, having a clutch-face, $E^5$, upon the hub thereof, and has also mounted upon it a key-seated sleeve, $E^6$, with a corresponding clutch-face to engage the clutch-face on the hub of the pinion, being held engaged therewith by means of a spirally-wound spring located upon the shaft between the end of the sleeve and the bearing $E^2$, and being held out of engagement therewith by means of an arm or lever, $E^7$, connected to said sleeve and to the frame. Upon the frame, adjacent to the bearing $E^2$, is located a post, $E^8$, upon which are mounted two independently-operating swiveling or oscillating levers, $e\ e'$, one arm of each of which is connected by a short chain, $e^2$, with the lever $E^7$, and the other arm of each lever being connected by a chain, $e^3$, with the frame of the machine, and at such a point at either side of the pivotal center on which the master-wheel swings as to act upon the lever to throw the clutch-sleeve out of engagement with the pinion-clutch during the latter part of the action of the wheel in turning the machine.

While in practice the means herein described for connecting the clutch mechanism with the frame has been found the most simple and convenient, still it will be readily seen that other means than those described may be employed without involving other than mechanical skill to suggest them.

The shaft $E^3$ is connected to a shaft mounted in the frame through a universal-joint connection, which shaft carries on its end a pinion, $E^9$, which in turn engages and communicates motion to a pinion, $E^{10}$, on the end of the roller-shaft $C'$, from which motion is communicated to the various parts of the machine. This pinion is also provided with a wrist-pin, to which the pitman for driving the cutters is connected.

The reel-post consists of a shaft, L, in two parts, connected by a universal joint having an arm, $L'$, at its upper end, extending at right angles therefrom, and a sleeved portion, $L^2$, surrounding the upper section of the shaft. The lower portion of the shaft is mounted in bearings $l$, secured to the post $C^7$, and the sleeve is connected at its lower end or base through a lug or ear to a shaft, $L^3$, extending between the posts $C^6$ $C^7$, and is supported at its upper end by a projecting arm, $L^4$, parallel with the shaft $L^3$, being connected with said shaft through a bent arm, $L^5$. The reel-shaft is connected to the upper end of the post from the arm $L'$ by a link, $L^6$, and in such manner as to move upon said arm as a pivot.

Upon the shaft $L^3$ is mounted a bell-crank lever, $L^7$, the outer end of the projecting arm $l^6$ of which is hinged or jointed, and has its end made in spherical form and secured to a divided link-arm, $l^7$, having semi-spherical recesses in each portion to embrace the end of the arm $l^6$, the two parts of the link being held together and to the arm $l^6$ by a screw or bolt, $l^8$, the upper end of the link $l^7$ being connected to the link $L^6$ through a lug, $l^9$, projecting therefrom. The outer arm of the bell-crank lever $L^7$ is connected to a rod, $L^8$, which in turn is connected with a quadrant-lever mounted on the cross-bar $C^{11}$, which lever is provided with a suitable spring-latch to engage the notches in the quadrant-rack, and by means of which connections the reel may be adjusted up and down. On the sleeved portion, at right angles to the arm $L^4$, is arranged a lug, $l^{10}$, to which a link, $L^{10}$, is connected, and which link at its rear end is in turn connected with a divided band, $C^{12}$, embracing a bar, $C^{13}$, extending from front to rear of the frame. The bar is bored out longitudinally and is provided with a central transverse longitudinal slot, M, and in the bar, in suitable bearings, is mounted a shaft, $M'$, which is provided on that part passing through the slot with a worm or screw-thread, $m'$, and which portion engages a nut held between the divided band, by means of which the band is caused to move on the bar and to rock the reel-post on the shaft $L^3$ and move the reel to or from the cutters, the shaft $M'$ being provided on its rear end, adjacent to the driver's seat, with a crank, $M^2$, for turning said shaft.

A miter-pinion, N, on the end of the roller-shaft engages a similar pinion, $N'$, on a shaft, $N^2$, parallel with the cutters, communicates motion to a sprocket-wheel, $N^3$, and from which motion is communicated to the larger wheel of a double sprocket, $N^4$, on the shaft $L^3$. A sprocket-chain running from the smaller wheel of the sprocket $N^4$ communicates motion to another double sprocket, $N^5$, on the shaft $L'$, and from the smaller one motion is communicated to a sprocket-wheel, $N^6$, on the reel-shaft. The lower end of the shaft L of the reel-post has rigidly attached to it a bent arm, P, extending outward and downward therefrom, and which arm is connected to the wheel-supporting bar D through a link, $P'$. By this means of connecting the reel-post with the turning mechanism it will be seen that a pivoted front supporting-wheel with the tongue attached may be used with a harvester, as the reel will be automatically turned out of the way of the team in turning the machine. The universal joint in the shaft, the hinged arm, and the ball-and-socket joint of the bell-crank lever and the sleeve connection heretofore described permit the reel to be adjusted to pick up lodged or fallen grain, or for other purposes, under any of the various angles of relation of the reel to the machine, without strain or friction on the parts.

A butt rake, R, is mounted in a suitable bearing-plate secured to the frame-timber A in rear of the posts $C^6$ $C^7$. This rake consists of a board arranged vertically upon one edge, and made of such length as to operate between the inner edge of the cutting apparatus and the point at which the grain is taken by the binding mechanism. This board is provided on its rear side with slotted guideways $R'$, one near each edge, through which a rod mounted in a suitable bearing, $R^2$, secured to the post $C^6$, passes, and which rod, while forming a pivotal connection for the inner end of the rake, permits said rake to reciprocate endwise. Near the forward end of the rake is formed or attached a lug, S, which is connected with an arm, $S'$, of a revolving shaft, $S^2$, mounted in a support, $S^3$, secured to the bearing-plate. The bearing-plate at this point extends outward and is provided with a circular opening to receive a pinion connected to the end of the shaft $S^2$, and which pinion engages with and is driven from a pinion, $S^4$, mounted on the shaft $N^2$, which communicates motion to the reel through the sprocket-wheel and pinion heretofore described. The rake is provided with suitable curved fingers, S⁵, on the end thereof adjacent to the cutters, to facilitate the handling of the grain. By this construction and manner of operating the rake it will be seen that the rake has both a lateral and swinging motion imparted thereto, and moves at its governing end in an elliptical path or orbit, acting upon the grain to force it toward and with the carrier, and, by extending between the cutting apparatus and binding devices, serves as a guide to direct the grain from the cutters to said devices.

Having now described my invention, I claim—

1. A harvester-frame, in combination with two or more supporting-wheels having pivotal connections with the frame and means for connecting them together intermediate of their pivotal connections, substantially as described, whereby the main frame is caused to have a lateral motion relative to the ground actuated by the wheels in turning the machine.

2. The combination of the main frame with the divided supporting-frame carrying the wheels at its outer ends and having pivotal connections with the main frame at points between the wheels and its point of division, and means for causing the parts of the frame to be actuated, one by the other, in the movement of the wheels in turning the machine, substantially as described.

3. The combination of the binder-frame, a main supporting-wheel arranged in rear thereof and having a pivotal connection therewith, a front supporting-wheel, also having a pivotal connection with the frame, a tongue connected to the wheel-frame, and means for connecting the wheel-frames intermediate of their pivotal connections, so as to move in unison, substantially as described, whereby the swinging of the tongue will cause the rear wheel to be turned at an opposite inclination to the front wheel and the frame to have a lateral motion relative to the ground, as set forth.

4. The combination, with the front and rear supporting-wheels having the carrier and binding devices located between the same, of an end wheel located at the grain side of the machine and having its frame supported at front and rear, substantially as described, whereby the main frame may move endwise in relation to said end wheel in turning the machine.

5. The combination of the front and rear supporting-wheels connected by means of the pivoted arms, the end or grain wheel connected to one of the arms of said supporting-wheels, and the main frame supported by the wheels, substantially as described, whereby the main frame is caused to move endwise in turning the machine, as and for the purpose set forth.

6. The combination of the harvester-frame, an outer or grain wheel supported in guideways, and the arms or levers connecting the grain-wheel with the turning mechanism, substantially as and for the purpose set forth.

7. The combination of the harvester-frame, an outer or grain wheel having its frame supported at front and rear in guideways in the harvester-frame, and means, substantially as described, for connecting the grain-wheel with the turning mechanism.

8. The combination of the harvester-frame, an outer or grain wheel supported in guideways, the rock-shaft in the harvester-frame, the arms or levers for connecting the rock-shaft with the grain-wheel frame, and means, substantially as described, for connecting the rock-shaft with the turning mechanism, as and for the purpose set forth.

9. The combination of the slotted supporting-frame for the grain-wheel, mounted on tracks or guideways and connected through mechanism with the pivoted supporting-wheels, the bell-crank lever pivoted to the supporting-frame and carrying at one end the grain-wheel, and means, substantially as described, connected to the other end of said lever for raising and lowering the grain-wheel, all substantially as set forth.

10. The combination of the cutting and grain delivering and binding devices described, and means for operating the same, with the automatic clutch mechanism acting to throw the same into and out of action in turning the machine, and a lever or shifting device for throwing the mechanism into and out of action by hand, substantially as set forth.

11. The combination of the main frame with the divided supporting-frame carrying the wheels at its outer ends and having pivotal connections with the main frame at points between the wheels and its points of division, a driving and driven mechanism, and an automatic and hand-operating clutch, substantially as described, whereby in turning the machine the driven mechanism may be thrown automatically out of action or may be thrown out by hand, as set forth.

12. The swiveling reel-post, combined with means, substantially as described, for automatically acting upon the reel to turn it in turning the machine, as and for the purpose set forth.

13. The combination of the harvester-frame, a pivoted wheel-supporting frame, a swiveling reel-post, and means, substantially as described, for connecting the reel-post with the wheel-supporting frame, as and for the purpose set forth.

14. The combination, with the front and rear supporting-wheels connected by the pivoted arms, of the swiveling reel-post connected with the arm of one of the supporting-wheels, substantially as described, whereby the reel is caused to be moved automatically out of the way of the team in turning the machine, as set forth.

15. A swiveling reel-post carrying the reel, combined with the machine to move said reel to and from the cutters automatically in turning the same, and means, substantially as described, whereby the reel can be raised and lowered in its various angles of relation to the machine, as and for the purpose set forth.

16. The combination of the carrier extending in beyond the cutters, the binding devices located at the inner end thereof, a vertically-arranged butt-rake pivoted near the inner end of the carrier and extending to the cutters, and means, substantially as described, arranged adjacent to the cutters, for imparting both an endwise and reciprocating motion to the rake, as set forth.

MARION L. NICHOLS.

Witnesses:
ALEX. MAHON,
WM. F. HUNTEMANN.